(12) United States Patent
Laurent et al.

(10) Patent No.: US 11,967,480 B2
(45) Date of Patent: Apr. 23, 2024

(54) IMAGE INTENSIFIER DEVICE WITH POWER SUPPLY DISPOSED UPSTREAM OF THE PHOTOCATHODE

(71) Applicant: PHOTONIS FRANCE, Brive la Gaillarde (FR)

(72) Inventors: Nicolas Laurent, Brive la Gaillarde (FR); Jorge De La Torre Noetzel, Madrid (ES); Diego Rodriguez-Perez, Madrid (ES); David Fernandez Gutierrez, Madrid (ES)

(73) Assignee: PHOTONIS FRANCE, Brive la Gaillarde (FR)

( * ) Notice: Subject to any disclaimer, the term of this patent is extended or adjusted under 35 U.S.C. 154(b) by 0 days.

(21) Appl. No.: 18/263,790

(22) PCT Filed: Jan. 31, 2022

(86) PCT No.: PCT/FR2022/050167
§ 371 (c)(1),
(2) Date: Aug. 1, 2023

(87) PCT Pub. No.: WO2022/167749
PCT Pub. Date: Aug. 11, 2022

(65) Prior Publication Data
US 2024/0105413 A1 Mar. 28, 2024

(30) Foreign Application Priority Data
Feb. 2, 2021 (FR) ....................................... 2100975

(51) Int. Cl.
*H01J 31/50* (2006.01)
*G02B 6/06* (2006.01)
(Continued)

(52) U.S. Cl.
CPC ............. *H01J 31/507* (2013.01); *G02B 6/06* (2013.01); *G02B 23/12* (2013.01); *G02B 25/001* (2013.01); *H01J 29/04* (2013.01)

(58) Field of Classification Search
CPC .......... H01J 31/507; H01J 29/04; G02B 6/06; G02B 23/12; G02B 25/001
See application file for complete search history.

(56) References Cited

U.S. PATENT DOCUMENTS

| 2009/0108180 A1* | 4/2009 | Saldana | ............... H01J 43/08 250/214 VT |
| 2013/0320192 A1* | 12/2013 | Saldana | ............... G02B 23/12 250/214 VT |

FOREIGN PATENT DOCUMENTS

FR  3097658 A1  12/2020
WO  2016032326 A1  3/2016

OTHER PUBLICATIONS

International Search Report for Application No. PCT/FR2022/050167 dated Mar. 24, 2022.
Written Opinion for PCT/FR2022/050167 dated Mar. 24, 2022.

* cited by examiner

*Primary Examiner* — Tony Ko
(74) *Attorney, Agent, or Firm* — Pearne & Gordon LLP

(57) ABSTRACT

An image intensifier device includes: an intensifier tube with at least one photocathode, a micro-channel plate and a conversion element, arranged in that order one after another, and an electric power supply module configured to supply at least one respective polarisation voltage to each of the elements of the intensifier tube. The electric power supply module extends in a region located upstream of the photocathode, on the side of the photocathode opposite to the micro-channel plate. Thus, a space is cleared located downstream of the intensifier tube in the direction of travel of the (Continued)

photons and of the electrons in the image intensifier device. This allows reducing the size of the image intensifier device for example by bringing an eyepiece closer.

10 Claims, 3 Drawing Sheets

(51) Int. Cl.
*G02B 23/12* (2006.01)
*G02B 25/00* (2006.01)
*H01J 29/04* (2006.01)

IMAGE INTENSIFIER DEVICE WITH POWER SUPPLY DISPOSED UPSTREAM OF THE PHOTOCATHODE

This is the National Stage of PCT international application PCT/FR2022/050167, filed on Jan. 31, 2022 entitled "IMAGE INTENSIFIER DEVICE WITH POWER SUPPLY DISPOSED UPSTREAM OF THE PHOTOCATHODE", which claims the priority of French Patent Application No. 2100975 filed Feb. 2, 2021, both of which are incorporated herein by reference in their entirety.

TECHNICAL FIELD

The field of the invention is that of image intensifier devices, used for the observation of a dimly lit scenery, in particular a night scenery.

PRIOR ART

An image intensifier device is based on the principle of light amplification successively through a photon-electron conversion operated by a photocathode, a multiplication of the number of electrons by secondary emission, and a final electron-photon conversion operated by a luminescent screen called phosphor screen.

FIG. 1 schematically illustrates an image intensifier device 100 according to the prior art. The image intensifier device includes the following elements, arranged one after another, in that order:
 a photocathode 110;
 a micro-channel plate 120, or MCP standing for "micro-channel plate"; and
 an electron-photon conversion element 130.

The photocathode 110 is arranged on the input side of the image intensifier device 100. In use, it is polarised by a first polarisation voltage. This stage is able to convert an incident photon beam into an initial electron beam, by photoelectric effect.

The micro-channel plate 120 is a component made of glass, crossed by a multitude of micro-channels. In use, it is polarised by a second polarisation voltage. This stage enables the multiplication of the electrical charges, by secondary emission. An inner field is created by the application of said second polarisation voltage, applied between the two faces (input and output) of the micro-channel plate. When an electron enters a micro-channel and hits its wall, this causes the emission of several so-called secondary electrons. The secondary electrons are accelerated by the inner field in the micro-channel plate 120 and in turn hit the wall of the micro-channel, which causes the emission of new secondary electrons. Hence, this consists of a cascading phenomenon. In the image intensifier device 100, the micro-channel plate 120 is configured to receive the initial electron beam emitted by the photocathode 110, and to send an intensified electron beam in response. Each electron of the initial electron beam arriving from the photocathode generates the emission of a plurality of electrons of the intensified electron beam.

Next, the electron-photon conversion element 130 is simply called "conversion element". In use, it is polarised by a third polarisation voltage. It is configured to receive the intensified electron beam, and to emit in response an intensified photon beam. Each electron in the intensified electron beam is at the origin of a respective photon of the intensified photon beam. Hence, the light distribution in the intensified photon beam corresponds to the light distribution in the incident photon beam on the photocathode, considerably amplified by the cascading emission at the micro-channel plate. Thus, a low light level image, supplied at the photocathode, is transformed into an image with enough luminosity to distinguish objects therein with the naked eye. Preferably, the conversion element 130 consists of a phosphor screen.

The photocathode 110, the micro-channel plate 120 and the conversion element 130 extend one after another, in that order, along the axis (Ox). Hence, the micro-channel plate 120 is located between the photocathode 110 and the micro-channel plate 120. It is possible to define a direction of circulation of the photons and of the electrons in the image intensifier device, which therefore herein corresponds to the axis (Ox), oriented from the photocathode 110 towards the conversion element 130.

Throughout the text, the terms "upstream" and "downstream" refer to the direction of circulation of the photons and of the electrons in the image intensifier device.

All of the photocathode 110, the micro-channel plate 120, and the conversion element 130 extend inside a sealed chamber, or intensifier tube 150, inside which a very low pressure prevails. The pressure level in the intensifier tube 150 is called "ultra-high vacuum" by a person skilled in the art. Inside the intensifier tube 150 herein extend two areas 151, 152, under ultra-high vacuum pressure. Said areas 151, 152 respectively extend between the photocathode 110 and the micro-channel plate 120, and between the micro-channel plate 120 and the conversion element 130. In this case, the photocathode 110 consists of a coating deposited over a porthole 111, said porthole forming an input window of the intensifier tube 150.

In the example illustrated in FIG. 1, the image intensifier device further includes an optical fibre array 140, which extends downstream of the conversion element 130, so that the conversion element 130 is located between the micro-channel plate 120 and the optical fibre array 140. The intensifier tube 140 is then closed, at its end opposite to the photocathode 110, by one of the ends of the optical fibre array 140. The conversion element 130 is in the form of a multilayer of luminescent micrometric grains. Each luminescent grain extends over one or more optical fibre(s) of the optical fibre array 140, on the side of the micro-channel plate 120.

The optical fibre array 140 is configured to reverse (i.e. rotate by 180°) an input image. In other words, an image supplied at the input of the optical fibre array is rotated by 180° around the axis (Ox), between the input and the output of the optical fibre array. Said image is further translated from one end to another of the optical fibre array 140, herein along the axis (Ox). The arrangement of the optical fibres at the input of the optical fibre array (on the side of the micro-channel plate 120), and the arrangement of the optical fibres at the output of the optical fibre array (on the side opposite to the micro-channels 120), are symmetrical with respect to each other according to a circular symmetry by an angle of 180°=n. The optical fibre array 140 allows pivoting by 180° the intensified image obtained at the conversion element 130, so that, in use, it is seen "right-side up" by the user. Thus, the matter is to compensate for the image reversal imparted by the objective 170 mentioned later on.

The assembly including the photocathode 110, the micro-channel plate 120, the conversion element 130, and the optical fibre array 140, is inserted between an objective 170 and an eyepiece 180.

The objective 170 consists of a set of one or more refractive optics, or lens(es). It is configured to carry out the optical conjugation between a focusing surface, or object surface, at which there is a scenery to be observed and/or imaged, and an initial image forming surface P1 located inside or at the input of the intensifier tube 150. In this case, the initial image forming surface P1 extends directly over the photocathode 110, over the active surface of the latter.

The eyepiece 180 consists of a set of one or more refractive optics, or lens(es). It is configured to carry out the optical conjugating between an intensified image forming surface P2, and an image surface located outside the intensifier tube 150.

The intensified image forming surface P2 refers to a surface on which, in use, an intensified image is formed by the photons emitted from the conversion element 130. Where appropriate, it is the surface meeting this condition, and which is closest to the optical output 153 of the intensifier tube 150. The optical output 153 of the intensifier tube 150 refers to an interface through which, in use, the intensified photon beam emitted by the conversion element 130 comes out into the free space. In this case, the optical output 153 of the intensifier tube 150 is formed by one end of the optical fibre array 140, on the side opposite to the micro-channel plate 120. The intensified image forming surface P2 then passes through the output faces of the optical fibres of the optical fibre array 140, on the side opposite to the micro-channel plate 120. The intensified image, formed at the surface P2, corresponds to the image formed at the conversion element 130, offset and pivoted by the optical fibre array 140.

Preferably, the image surface corresponds to a surface viewed clearly by the user, for an eye at rest looking through the eyepiece 180. For optimum visual comfort, the dioptre of the eyepiece 180 may be adjusted. In use, a user places his eye behind the eyepiece 180, on the side opposite to optical fibre array 140. The image surface and the retina of the eye are then optically conjugated by an optical system formed by the elements of the eye between the retina and the cornea and, where appropriate, vision correction optics such as a contact lens. For an emmetropic eye, the image surface extends to infinity.

Each of the photocathode 110, the micro-channel plate 120, and the conversion element 130, is connected to an electric power supply module 160, which supplies it with a respective polarisation voltage (respectively called first, second and third polarisation voltage). The electric power supply module 160 is connected at the input to a low-voltage electrical source (not shown), for example a battery. It is configured to convert the low-voltage thus received, into at least one high voltage respectively forming the first, second and third polarisation voltages, and to supply these polarisation voltages to each of the photocathode 110, the micro-channel plate 120, and the conversion element 130.

The electric power supply module 160 and the intensifier tube 150 extend together inside a housing 190, generally in the form of a tube.

As illustrated in FIG. 1, the electric power supply module 160 extends around the optical fibre array 140.

FIG. 1 also shows an arrow 101 symbolising the back focus of the eyepiece 180, or in other words the distance required between the intensified image forming surface P2 (herein at the output of the optical fibre array 140), and the eyepiece 180 (at the level of an interface 181 of the eyepiece 180 located opposite the conversion element 130). The back focus 101 corresponds to the distance enabling the eyepiece 180 to achieve optical conjugating between the intensified image forming surface P2, and the image surface sharply viewed by the user, in use.

An objective of the present invention is to provide an image intensifier device, able to have a reduced size in comparison with the image intensifier devices according to the prior art.

DISCLOSURE OF THE INVENTION

This objective is achieved with an image intensifier device which comprises an intensifier tube and an electric power supply module, wherein the intensifier tube includes:
  at least one photocathode, configured to convert an incident photon beam into an initial electron beam;
  a micro-channel plate, configured, in use, to generate a plurality of secondary electrons in response to the reception of an incident electron, and configured to receive said initial electron beam and to generate in response an intensified electron beam;
  a conversion element, configured to receive the intensified electron beam and to emit in response an intensified photon beam, with the micro-channel plate located between the photocathode and the conversion element;
  an electric power supply module, configured to supply at least one respective voltage, to each of the photocathode, the micro-channel plate, and the conversion element;
  and wherein the electric power supply module extends in a region located upstream of the photocathode, on the side of the photocathode opposite to the micro-channel plate.

The conversion element may also be called "photon-electron conversion element".

In use, each incident electron on the micro-channel plate generates the emission of a large number of secondary electrons, preferably more than ten.

One solution for reducing the size of an image intensifier device, of the type shown in FIG. 1, consists in reducing the length of the optical fibre array. Indeed, recent developments have enabled the production of an array of fibres able to reverse an input image, and having a reduced length while preserving the optical transmission and contrast requirements allowing ensuring a consistent image quality.

FIG. 2 illustrates an image intensifier device 100', which differs from that one of FIG. 1 only in that the optical fibre array 140' has a reduced length. Like in the prior art, the conversion element 130' extends at the input of the optical fibre array, and the intensified image forming surface P2 is located at the output of the optical fibre array 140. Because of the reduced length of the optical fibre array 140', the intensified image forming surface P2 is set back significantly with respect to the outlet of the housing 190'. In order to keep the required distance between the intensified image forming surface P2 and the eyepiece 180', it is therefore necessary to bring the housing 190' and the eyepiece 180' closer to each other. The eyepiece 180' could be brought closer to the housing 190', at most up to an extreme position in which the eyepiece 180' is pressed against an output edge 191' of the housing 190'. The output edge 191' of the housing 190' refers to its edge the farthest from the objective 170. If the length reduction of the bundle of optical fibres 140' is significant, even in this extreme position it is impossible to obtain that the distance between the intensified image forming surface P2 and the eyepiece 180' is equal to the back focus 101' of the eyepiece (cf. FIG. 2). A person skilled in the art could then have the idea of reducing the length L of the housing 190', to reduce a distance between the intensified image forming surface P2 and the output edge 191' of the housing 190'. However, he will be limited by the size of the electric power supply module 160'. The obvious solution to overcome this problem consists in miniaturising this electric power supply module 160'.

An idea at the origin of the invention then consists in reconsidering the entire arrangement of the different elements in the image intensifier device, and in moving the electric power supply module, instead of simply modifying its dimensions. According to the invention, the electric power supply module is moved towards a region located on the upstream side of the photocathode according to the direction of circulation of the photons and electrons in the image intensifier device (i.e. on the side of the photocathode opposite to the micro-channel plate). This new location allows bringing the intensified image forming surface P2 closer to the output edge 191' of the housing 190', without any restriction. It then becomes possible to comply with the distance required between the intensified image forming surface and the eyepiece, while having a bundle of optical fibres with a reduced length. Furthermore, since the electric power supply module is moved rather than miniaturised, it is not necessary for the latter to be entirely modified to integrate miniaturised inner components therein.

Moving the electric power supply module is not an obvious solution for a person skilled in the art. The latter is rather encouraged to keep the previous arrangements, in particular to avoid having to resize the different housings and caps in the image intensifier device, and to avoid having to reconsider the problems of electrical insulation around the electric power supply module as well as connectors (high-voltage power supply wires conveying very low currents).

This new location of the electric power supply module clears a space located on the downstream side of the conversion element, depending on the direction of circulation of the photons and electrons in the image intensifier device. Clearing this space allows reducing the size of the image intensifier device. For example, clearing this space allows reducing a distance between the conversion element and an auxiliary element such as an eyepiece. This technical advantage is found in the presence of a bundle of optical fibres downstream of the conversion element, but also in the absence of such a bundle of optical fibres.

Advantageously, the electric power supply module extends around the periphery of an objective as described with reference to FIG. 1. The diameter of the objective being possibly smaller than that of the intensifier tube, it is possible to exploit a space around the objective to accommodate the electric power supply module therein without increasing the total diameter of the image intensifier device.

Preferably, the electric power supply module extends outside the intensifier tube.

Preferably, the device according to the invention further includes a first set of lenses, called objective, configured to optically conjugate a focusing surface located outside the intensifier tube, and an initial image forming surface located inside or at the input of the intensifier tube, and the electric power supply module extends at the periphery of the objective.

Advantageously, the electric power supply module does not protrude beyond the objective, on either side of the latter and along an axis parallel to the optical axis of the latter.

Preferably, the electric power supply module includes a through opening which extends opposite the photocathode. The electric power supply module may have a ring shape.

According to an advantageous embodiment, the device according to the invention further includes a bundle of optical fibres, arranged downstream of the conversion element in the direction of propagation of the photons and of the electrons in the image intensifier device, with the optical fibres of the bundle of optical fibres arranged so as to pivot on itself an image supplied at the input of the bundle of optical fibres, and with an output surface of the bundle of optical fibres, on the side opposite to the conversion element, which forms a surface called intensified image forming surface.

According to another advantageous embodiment, the device according to the invention further includes a transparent support, with the conversion element formed by a coating covering at least one portion of one face of said transparent support, and with said face of the transparent support which forms a surface called intensified image forming surface.

The device according to the invention may further include a second set of lenses, called eyepiece, configured to optically conjugate the intensified image forming surface and an image surface located outside intensifier tube. The device according to the invention may further include a complementary image forming module, configured to supply a complementary image, as well as a partially-reflective element, which extends between the eyepiece and the intensified image forming surface and which is configured to superimpose the complementary image and an intensified image formed at the intensified image forming surface.

According to an advantageous variant, the device according to the invention may further include an offset element, configured to laterally offset an intensified image originating directly or indirectly from the intensified image forming surface. The offset element may be at least partially transparent in the visible, to enable the superposition of the intensified image offset by the offset element, with a view in transparency of a surrounding scenery.

BRIEF DESCRIPTION OF THE DRAWINGS

The present invention will be better understood upon reading the description of embodiments given merely for indication and without limitation, with reference to the appended drawings wherein.

DETAILED DISCLOSURE OF PARTICULAR EMBODIMENTS

For more clarity, the axes of an orthonormal reference frame (Oxyz) have been shown in the figures. In this case, the axis (Ox) corresponds to the direction of propagation of light in the image intensifier device according to the invention.

Figure 1:
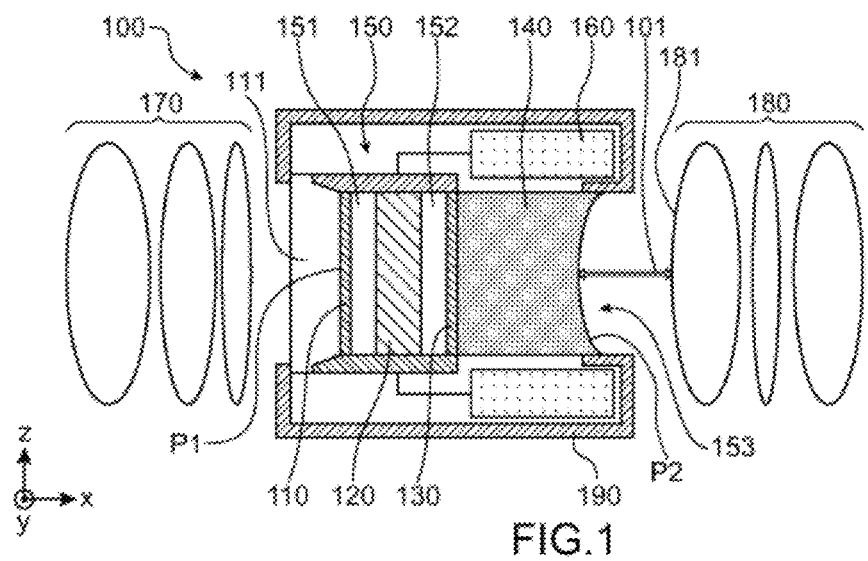
FIG. 1 schematically illustrates an image intensifier device according to the prior art.
Figure 2:
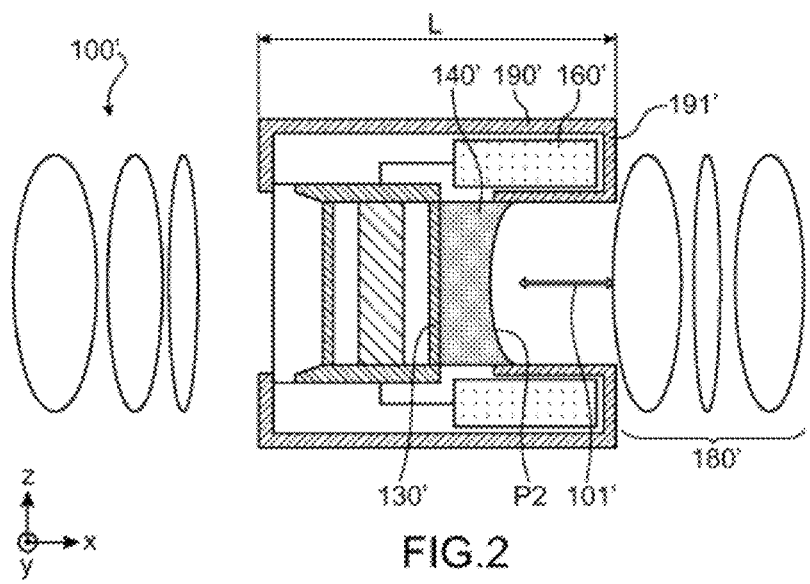
FIG. 2 schematically illustrates an image intensifier device integrating an optical fibre array with a reduced length.
Figure 3:
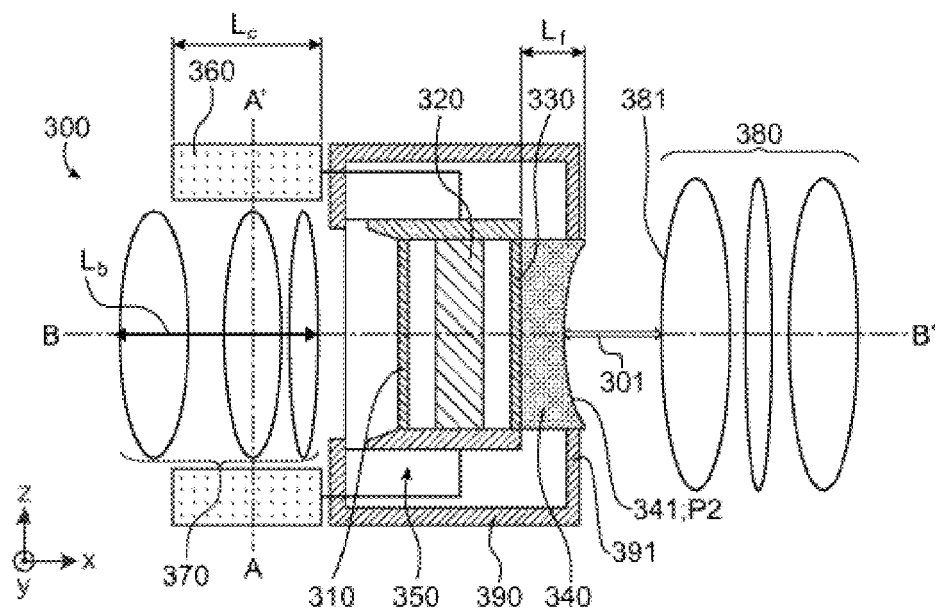
FIG. 3 schematically illustrates an image intensifier device according to a first embodiment of the invention.

FIG. 3 schematically illustrates, according to a sectional view, an image intensifier device 300 according to a first embodiment of the invention. The image intensifier device 300 will be described only for its differences compared to the embodiment of FIG. 1.

In this case, the electric power supply module 360 does not extend around the optical fibre array 340, and the optical fibre array 340 has a reduced length.

The electric power supply module 360 herein extends at the periphery of the objective 370, in a region located upstream of the photocathode 310, i.e. on the side of the photocathode 310 opposite to the micro-channel plate 320 and to the conversion element 330.

Like before, the photocathode 310, the micro-channel plate 320, the conversion element 330 extend inside an intensifier tube 350 as described in the introduction. The intensifier tube 350 itself extends, with the optical fibre array 340, inside a housing 390. Each of the photocathode 310, the micro-channel plate 320 and the conversion element 330 herein extend in planes parallel to the plane (Oyz).

Like before, an output edge 391 is defined on the housing 390, located on the side of the optical fibre array 340 and facing the eyepiece 380. The output edge 391 of the housing 390 herein extends in a plane (yOz), parallel to the plane of the micro-channel plate 320.

The intensified image forming surface, P2, as described in the introduction, is herein located on the output end of the optical fibre array 340. In particular, the intensified image forming surface, P2, consists of a surface passing through the output faces of the optical fibres of the optical fibre array 340, on the side of the optical fibres opposite to the micro-channel plate 320. The intensified image forming surface P2 is herein a non-planar surface, the topology of which follows that of a first interface 381 belonging to the eyepiece 380, where said first interface 381 is located on the side of the conversion element 330.

The electric power supply module 360 does not extend around the optical fibre array 340, but in a region located upstream of the photocathode 310. Thus, even with a reduced length Lf of the optical fibre array 340, the output edge 391 of the housing 390 is close to the output end 341 of the optical fibre array 340. Hence, the output edge 391 of the housing 390 is close to the intensified image forming surface P2. Thus, despite an optical fibre array 340 with a reduced length Lf, the distance between the intensified image forming surface P2 and the first interface 381 belonging to the eyepiece 380, is equal to the back focus 301 of the eyepiece 380 (as defined in the introduction).

The electric power supply module 360 herein extends at the periphery of the photocathode 310, in an orthogonal projection of these in a plane parallel to the plane (Oyz).

In this case, the optical fibre array 340 protrudes slightly outside the housing 390. Hence, the intensified image forming surface P2 extends outside the housing 390.

The electric power supply module 360 is herein located outside the intensifier tube 350 and the housing 390. It has herein a length Lc, measured according to the axis (Ox), strictly smaller than the length Lb of the objective 370, measured according to the same axis. Furthermore, it does not protrude beyond the objective 370, along the axis (Ox) (parallel to the optical axis BB' of the objective 370).

Figures 4A, 4B:
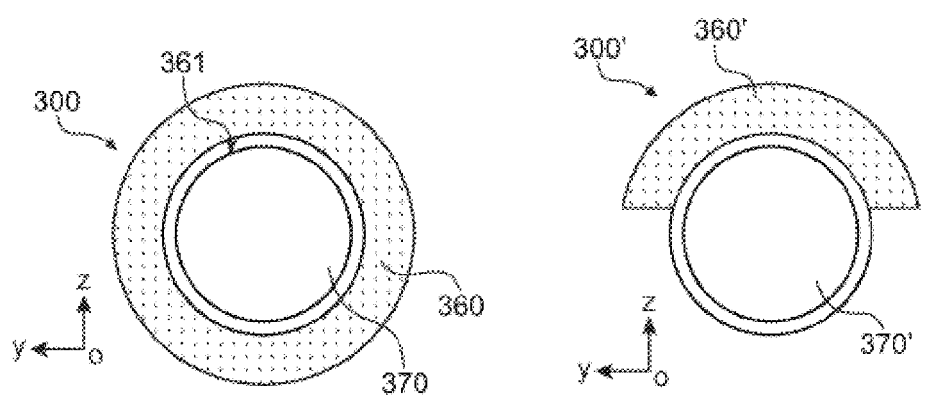
FIG. 4A and FIG. 4B schematically illustrate two examples of arrangement of the electric power supply module in an image intensifier device according to the invention.

FIG. 4A illustrates the image intensifier device 300, according to a sectional view in a plane AA' parallel to the plane (yOz) and passing through the electric power supply module 360. FIG. 4A shows that the electric power supply module 360 surrounds the objective 370, over a 380° angle. In other words, the electric power supply module 360 is provided with a through opening 361, inside which the objective 370 extends. The through opening 361 is located opposite the photocathode 310. Preferably, the through opening 361 has an axisymmetric cylinder shape, with an axis of revolution orthogonal to the plane (Oyz) of the photocathode 310 and preferably passing through the centre of the latter. In this case, yet without limitation, the electric power supply module 360 is shaped as a first axisymmetric cylinder, open at the centre by a through opening 361 shaped as a second axisymmetric cylinder concentric with the first axisymmetric cylinder. In other words, the electric power supply module 360 has a ring shape. In variants that are not shown, the electric power supply module 360 has any shape, provided with a through opening shaped as an axisymmetric cylinder as described hereinabove. According to still other variants, the opening at the centre has not an axisymmetric cylinder shape, but has any shape able to let light pass up to the photocathode 310.

In a variant 300' illustrated in FIG. 4B, the electric power supply module 360' only surrounds the objective 370 over an angle smaller than or equal to 180°.

Many other forms of electric power supply module may be implemented, without departing from the scope of the invention, in particular forms wherein the electric power supply module is not centred on the optical axis BB'.

Preferably, the electric power supply module 360 does not protrude beyond the housing 390, in an orthogonal projection of the latter in a plane (Oyz). In other words, the orthogonal projection of the electric power supply module 360, in a plane (yOz), is inscribed inside the orthogonal projection of the housing 390 in the same plane. For this purpose, the maximum diameter of the objective 370 is strictly smaller than the outer diameter of the housing 390, and the electric power supply module 360 extends in a space delimited by the edge of the objective 370 and a tube with the same diameter as the outer diameter of the housing 390. Thus, it is ensured that the electric power supply module 360 does not increase a total size of the image intensifier device, in particular a diameter of the image intensifier device.

Two embodiments are described hereinafter wherein the new arrangement of the electric power supply module has an advantage, even in the absence of an optical fibre array at the output of the intensifier tube. In particular, in these embodiments, the new arrangement of the electric power supply module clears a space for inserting auxiliary elements allowing adding new functions to the image intensifier device, always with reduced size.

Figure 5:
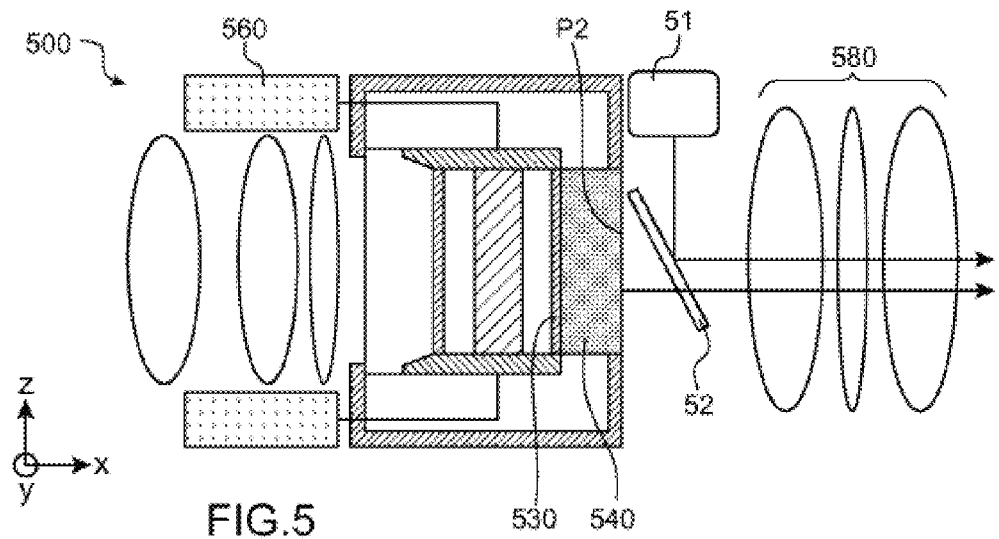
FIG. 5 schematically illustrates an image intensifier device according to a second embodiment of the invention.

FIG. 5 illustrates a second embodiment of an image intensifier device 500 according to the invention, wherein the space cleared by the electric power supply module is used to add additional functions to the device without increasing its size.

The image intensifier device 500 differs from the embodiment of FIG. 3 only in that it does not include an optical fibre array at the output of the intensifier tube, and in that it includes a complementary image generation and superposition means.

The complementary image generation and superposition means herein includes a complementary image forming module 51, and a partially-reflective mirror 52.

The partially-reflective mirror 52 extends between the eyepiece 580 and the intensified image forming surface P2. The partially-reflective mirror 52 reflects a portion of the incident light, and transmits another portion of the incident light. In this case, the partially-reflective mirror 52 is a semi-reflective mirror. It is inclined by an angle α with respect to the plane (Oyz), herein with α=45°. In variants that are not shown, the partially-reflective mirror 52 is replaced by any other partially-reflective element, for example a splitter cube, or a splitter blade.

In turn, the complementary image forming module 51 is configured to generate a so-called complementary image, and to project the latter in the direction of the partially-reflective mirror 52, herein along the axis (Oz). The complementary image forming module 51 comprises a display screen, in particular a screen based on OLED (organic light-emitting diodes). It may further comprise a processor, connected to the display screen, and integrating the electronics necessary for controlling and electrically powering said screen, as well as the electronics necessary for exchanging data with the outside (to receive data relating to the complementary image to be displayed on the screen).

The complementary image forming module 51 extends at the periphery of the partially-reflective mirror 52, and in particular occupies at least one portion of a region occupied, in the prior art, by the electric power supply module 560.

The partially-reflective mirror 52 is configured to superimpose the complementary image, projected by the complementary image forming module 51, and an intensified image formed at the intensified image forming surface P2. For this purpose, the complementary image forming module 51 is configured to project a complementary image, arriving at an incidence of 45° on the partially-reflective mirror 52, while propagating according to the axis (Oz). In use, this complementary image is reflected at least partially in the direction of the eyepiece 580. In turn, the intensified image formed at the output end of the bundle of optical fibres 540 arrives at an incidence of 45° on the partially-reflective mirror 52, while propagating according to the axis (Ox). In use, this intensified image is transmitted at least partially in the direction of the eyepiece. Downstream of the partially-reflective mirror 52, in the direction of circulation of the light (and of the electrons) in the device 500, the complementary image is thus superimposed on the intensified image.

Advantageously, the complementary image has dimensions similar to those of the intensified image. For example, the complementary image consists of graphic symbols. For example, it possible to superimpose on the intensified image, symbols relating to measurements provided by additional sensors (for example display of cardinal points, an aiming reticle, etc.).

In this case, the intensified image forming surface P2 is a planar surface, to simplify the superposition of the intensified image with the complementary image. However, the invention also covers variants wherein the intensified image forming surface P2 is a non-planar surface, for example a concave surface.

Figure 6:
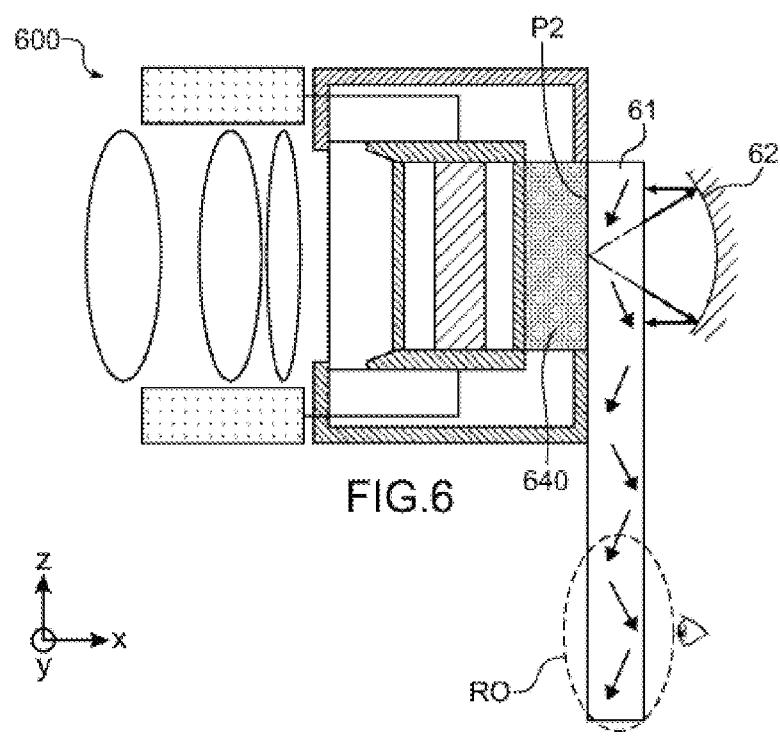
FIG. 6 schematically illustrates an image intensifier device according to a third embodiment of the invention.

FIG. 6 illustrates a third embodiment of an image intensifier device 600 according to the invention, which will be described only for its differences compared to the embodiment of FIG. 3.

In this embodiment, the image intensifier device 600 does not include an optical fibre array at the output of the intensifier tube, and includes a real image superposition means.

The real image superposition means herein includes an offset element 61, and focusing optics 62. The offset element 61 herein extends between the intensified image forming surface P2 and the focusing optics 62.

The focusing optics 62 herein consist of a concave reflective mirror, with its optical axis parallel to the axis (Ox) and with its reflective face located on the side of the intensified image forming surface P2. The focusing optics 62 are configured to project the intensified image P2 formed on the intensified image forming surface P2 to infinity. In this case, the image is projected to infinity, in the direction of the intensified image forming surface P2.

The offset element 61 is herein affixed against the intensified image forming surface P2. This arrangement is made possible thanks to the space cleared by the forward movement of the electric power supply module.

Herein again, yet without limitation, the intensified image forming surface P2 is a planar surface, to facilitate surface contact with the offset element 61.

The offset element 61 herein comprises a waveguide, which covers the intensified image forming surface P2, and projects laterally beyond this surface up to a so-called observation region RO. Said waveguide is provided with injection elements and extraction elements. For example, the injection and extraction elements consist of respective diffractive elements, etched at the surface of the waveguide. In this case, the injection elements, not shown, extend opposite the intensified image forming surface P2, on the side of the focusing optics. Furthermore, the extraction elements, not shown, herein extend into the observation region RO, on the side of the focusing optics.

The offset element 61 is at least partially transparent in the visible. For example, it has a transmission coefficient higher than or equal to 95%, over a range of wavelengths ranging from 400 nm to 700 nm.

In use, the intensified image formed at the surface P2 propagates up to the focusing optics 62, while passing throughout the offset element 61. At the level of the focusing optics, the light is collimated, and sent back in the opposite direction. In other words, the intensified image is projected to infinity and sent back in the opposite direction. Thus, the light sent back by the focusing optics 62 returns to the offset element 62, at the level of the injection elements as mentioned hereinabove. Thus, the light penetrates inside the offset element 62, in the waveguide, and there initiates an optical guidance. In the waveguide, the light is guided, along the axis (Oz), up to the observation region RO. When it reaches the level of the aforementioned extraction elements, the light is extracted from the waveguide. The extracted light is collimated, like the light initially injected into the waveguide. Hence, the offset element 61 is configured to receive an intensified image at the input, to offset this intensified image laterally so as to bring it up to the observation region RO, and to extract this intensified image outward of the offset element 61. The intensified image which is laterally offset using the offset element 61, is an image which originates directly or indirectly from the intensified image forming surface P2. In this case, it originates indirectly from said surface P2, since it corresponds to the intensified image formed on surface P2 then projected to infinity by the focusing optics 62.

In use, the user places his eye opposite the offset element 61, opposite the observation region RO, where the intensified image comes out projected to infinity and having circulated in the offset element 61. Thus, the user visualises, in superposition, the intensified image brought by the offset element 61, and an external scenery viewed in transparency through the offset element 61. The image intensifier device 600 thus forms an augmented reality vision device, to offer a view corresponding to the superposition of an intensified image and an image in natural vision.

In this embodiment, the image intensifier device 600 does not include an eyepiece arranged directly at the output of the bundle of optical fibres.

Advantageously, the offset element 61 is secured to the bundle of optical fibres 640 by direct bonding or proximity coupling to the output face of the latter.

In a variant that is not shown, the focusing optics extend between the intensified image forming surface P2 and the offset element. The focusing optics then consist of one or more refractive lens(es). Herein again, the focusing optics are configured to project the intensified image formed on the intensified image forming surface P2 to infinity. Herein again, the image is projected in the direction of the offset element, herein on the side of the focusing optics opposite to the surface P2. The image thus projected to infinity enters the offset element, and is brought up to the observation region where it is extracted from the offset element. The back focus of the focusing optics may be very short. The invention then allows approaching the focusing optics close enough to the plane P2, thanks to the space cleared by the forward movement of the electric power supply module.

The invention is not limited to the above-described examples. For example, in a variant not shown, the image intensifier device does not include the optical fibre array, but a transparent support such as a glass block. In this case, the conversion element is in the form of a coating extending integrally in one-piece over one face of said transparent support. The transparent support is transparent to the wavelength of the photons emitted by the conversion element. The intensified image forming surface is then coincident with the surface according to which the coating forming the conversion element extends, on the transparent support. The reversal of the image "right-side up" is achieved by refractive optics. The different embodiments and variants of the invention described hereinbefore may be easily combined with this variant.

According to still other variants, the intensifier device includes a bundle of optical fibres, forming an optical input of the intensifier tube on the photocathode side. In this case, the initial image forming surface, P1, as mentioned hereinbefore, is formed by one end of the bundle of optical fibres, on the side opposite to the photocathode. This embodiment may be combined, or not, with the presence of a bundle of optical fibres at the output of the intensifier tube, on the conversion element side. This embodiment may be combined with each of the above-described examples, variants and embodiments.

According to still other variants, the electric power supply module may be located inside the housing receiving the intensifier tube and the bundle of optical fibres.

The invention also covers a twin-type system, including two image intensifier devices according to the invention, each dedicated to a respective eye of the user.

The device according to the invention finds an advantageous use in the field of night vision, for observing dimly lit or dark sceneries.

The invention may be adapted to night vision devices devoid of a micro-channel plate, based rather on the use of a photocathode and a CMOS sensor able to convert an incident flux of electrons into an electrical measurement signal. In such a device, the electric power supply module, able to supply a polarisation voltage to the photocathode, may be arranged rather upstream of the photocathode in the direction of circulation of light and of the electrons in the device.

What is claimed is:

1. An image intensifier device comprising an intensifier tube and an electric power supply module, wherein the intensifier tube includes:

at least one photocathode, configured to convert an incident photon beam into an initial electron beam;

a micro-channel plate, configured, in use, to generate a plurality of secondary electrons in response to the reception of an incident electron, and configured to receive said initial electron beam and to generate in response an intensified electron beam; and a conversion element, configured to receive the intensified electron beam and to emit in response an intensified photon beam, with the micro-channel plate located between the photocathode and the conversion element;

a first set of lenses, called objective, configured to optically conjugate a focusing surface located outside the intensifier tube, and an initial image forming surface located inside or at the input of the intensifier tube;

the electric power supply module being configured to supply at least one respective biasing voltage, to each of the photocathode, the micro-channel plate, and the conversion;

wherein the electric power supply module extends in a region located entirely upstream of the photocathode, on the side of the photocathode opposite to the micro-channel plate, at the periphery of the objective.

2. The device according to claim 1, wherein the electric power supply module does not protrude beyond the objective, on either side of the latter and along an axis parallel to the optical axis of the latter.

3. The device according to claim 1, wherein the electric power supply module includes a through opening which extends opposite the photocathode.

4. The device according to claim 3, wherein the electric power supply module is ring-like shaped.

5. The device according to claim 1, further including a bundle of optical fibres, arranged downstream of the conversion element in the direction of propagation of photons and electrons in the image intensifier device, with the optical fibres of the bundle of optical fibres arranged so as to pivot on itself an image supplied at the input of the optical fibre bundle, and with an output surface of the optical fibre bundle, on the side opposite to the conversion element, which forms a surface called intensified image forming surface.

6. The device according to claim 5, further including a second set of lenses, called eyepiece, configured to optically conjugate the intensified image forming surface and an image surface located outside the intensifier tube.

7. The device according to claim 6, further including a complementary image forming module, configured to provide a complementary image, as well as a partially-reflective element, which extends between the eyepiece and the intensified image forming surface and which is configured to superimpose the complementary image and an intensified image formed at the intensified image forming surface.

8. The device according to claim 5, further including an offset element, configured to laterally offset an intensified image originating directly or indirectly from the intensified image forming surface.

9. The device according to claim 8, wherein the offset element is at least partially transparent in the visible, to enable the superposition of the intensified image offset by the offset element, with a view in transparency of a surrounding scenery.

10. The device according to claim 1, further including a transparent support, the conversion element being formed by a coating covering at least one portion of one face of said transparent support, and another face of the transparent support forming a surface called intensified image forming surface.

* * * * *